(12) United States Patent
Maurya et al.

(10) Patent No.: US 7,747,781 B2
(45) Date of Patent: Jun. 29, 2010

(54) CONTENT ACCESS FROM A COMMUNICATIONS NETWORK USING A HANDHELD COMPUTER SYSTEM AND METHOD

(75) Inventors: Sanjiv Maurya, Fremont, CA (US); Michel Turcotte, San Jose, CA (US)

(73) Assignee: PalmSource Inc., Sunnyvale, CA (US)

( * ) Notice: Subject to any disclaimer, the term of this patent is extended or adjusted under 35 U.S.C. 154(b) by 676 days.

(21) Appl. No.: 09/839,066

(22) Filed: Apr. 20, 2001

(65) Prior Publication Data
US 2002/0156833 A1  Oct. 24, 2002

(51) Int. Cl.
*G06F 15/16* (2006.01)

(52) U.S. Cl. .................. 709/246; 709/203; 709/219

(58) Field of Classification Search ................ 709/264, 709/217–229, 200–207, 245, 243, 236–238; 345/804, 806; 707/2, 10, 200; 715/667, 715/670, 522–524, 234, 239; 341/50; 718/103, 718/105
See application file for complete search history.

(56) References Cited

U.S. PATENT DOCUMENTS

| | | | | |
|---|---|---|---|---|
| 5,727,159 A * | 3/1998 | Kikinis | ................. | 709/246 |
| 5,961,594 A * | 10/1999 | Bouvier et al. | .............. | 709/223 |
| 6,049,821 A * | 4/2000 | Theriault et al. | ............ | 709/203 |
| 6,199,104 B1 * | 3/2001 | Delph | ................. | 709/208 |
| 6,237,031 B1 * | 5/2001 | Knauerhase et al. | ........ | 709/221 |
| 6,247,048 B1 * | 6/2001 | Greer et al. | ................. | 709/219 |
| 6,247,050 B1 * | 6/2001 | Tso et al. | .................... | 709/224 |
| 6,300,947 B1 * | 10/2001 | Kanevsky | .................... | 715/866 |
| 6,311,215 B1 * | 10/2001 | Bakshi et al. | ............... | 709/221 |
| 6,401,132 B1 * | 6/2002 | Bellwood et al. | ........... | 709/246 |
| 6,421,733 B1 * | 7/2002 | Tso et al. | .................... | 709/246 |
| 6,490,256 B1 * | 12/2002 | Jones et al. | .................. | 370/277 |
| 6,556,217 B1 * | 4/2003 | Makipaa et al. | ............. | 345/667 |
| 6,563,517 B1 * | 5/2003 | Bhagwat et al. | ............. | 345/735 |
| 6,593,860 B2 * | 7/2003 | Lai et al. | ...................... | 341/50 |
| 6,615,212 B1 * | 9/2003 | Dutta et al. | ................... | 707/10 |
| 6,642,941 B1 * | 11/2003 | Kurata et al. | ................ | 345/733 |
| 6,662,224 B1 * | 12/2003 | Angwin et al. | .............. | 709/224 |

(Continued)

OTHER PUBLICATIONS

*DataViz: Product Overview* and *DataViz: Product Features* printed from the web site: http://www.dataviz.com/products/documentstogo/ on Jul. 5, 2001, 4 pps.

(Continued)

*Primary Examiner*—Asad M Nawaz
(74) *Attorney, Agent, or Firm*—Berry & Associates P.C.

(57) ABSTRACT

A handheld computer including a wireless communications link with a wireless server is disclosed. The wireless communications link allows browsing of information provided through the wireless server which is coupled to a communications network. A user of the handheld computer may generate a request for content, for example, by selecting a link to content. The request is communicated to the wireless server which requests the content from the content source. When the content is received by the wireless server, a plug-in mechanism or other type of software program is used to convert the particular content type into a format easily communicated and used by the handheld computer. The handheld computer receives the formatted content, and using a compatible plug-in mechanism or software program, is able to display content using the handheld computer.

18 Claims, 6 Drawing Sheets

U.S. PATENT DOCUMENTS

| | | | |
|---|---|---|---|
| 6,741,980 B1* | 5/2004 | Langseth et al. | 707/2 |
| 6,832,116 B1* | 12/2004 | Tillgren et al. | 700/1 |
| 6,937,588 B2* | 8/2005 | Park | 370/338 |
| 7,039,946 B1* | 5/2006 | Binding et al. | 726/3 |
| 7,117,361 B1* | 10/2006 | Hild et al. | 713/161 |
| 7,177,793 B2* | 2/2007 | Barker et al. | 704/8 |
| 7,500,195 B2* | 3/2009 | Sahota et al. | 715/733 |
| 2002/0002603 A1* | 1/2002 | Vange | 709/219 |
| 2002/0046262 A1* | 4/2002 | Heilig et al. | 709/219 |
| 2002/0099785 A1* | 7/2002 | Teeple | 709/214 |
| 2002/0116534 A1* | 8/2002 | Teeple | 709/246 |
| 2002/0133566 A1* | 9/2002 | Teeple | 709/218 |
| 2003/0061309 A1* | 3/2003 | Brown et al. | 709/218 |
| 2003/0061386 A1* | 3/2003 | Brown et al. | 709/246 |
| 2004/0039618 A1* | 2/2004 | Cardenas-Vasquez | 705/7 |
| 2004/0172484 A1* | 9/2004 | Hafsteinsson et al. | 709/246 |
| 2004/0205114 A1* | 10/2004 | Kinoshita | 709/202 |
| 2005/0114757 A1* | 5/2005 | Sahota et al. | 715/501.1 |
| 2006/0031759 A1* | 2/2006 | Brown et al. | 715/514 |
| 2008/0082603 A1* | 4/2008 | Mansour et al. | 709/203 |
| 2008/0275886 A1* | 11/2008 | Caruso et al. | 707/10 |
| 2008/0275906 A1* | 11/2008 | Rhoads et al. | 707/102 |

OTHER PUBLICATIONS

*Quickoffice*™ (home page), *Quickoffice*™ *Overview*, *Quickoffice* ™ *Details*, *Quickoffice*™ *Screenshots*, and *Quickoffice*™ *Solutions*, printed from the web site: http://www.cesinc.com/land/qo/insync_p.html, on Jul. 6, 2001, 12 pps.

* cited by examiner

CONTENT ACCESS FROM A COMMUNICATIONS NETWORK USING A HANDHELD COMPUTER SYSTEM AND METHOD

FIELD OF THE INVENTION

The present specification relates to a method and apparatus for accessing content on a handheld computer. In particular, the content is provided over a communications network, such as the internet, to a wireless server which communicates wirelessly with the handheld computer.

BACKGROUND OF THE INVENTION

The internet includes a communications network linking a vast number of computers with smaller computers, computer networks, and wireless devices. The computers coupled to these networks exchange information using various services, such as electronic mail, gopher, and the World Wide Web (WWW). The World Wide Web allows a computer server (sometimes referred to as a web server or a website) to send graphical web page information to a remote client computer system. The remote client computer system is configured to display the web page information in a graphical format.

Resources, such as individual computers or individual web pages on the World Wide Web may be uniquely identified by a uniform resource locator (URL). For a user to view a specific web page, a client computer system specifies the URL for that web page in a request, such as a hypertext transfer protocol (HTTP) request. The request is forwarded through the communications network, to the web server that supports the particular web page. The web server responds to the request by sending the particular web page through the requesting client computer system. When the requesting client computer system receives the particular web page, the particular web page is displayed on a video display using a browser. The browser is typically a special-purpose application program that affects the requesting of web pages and the supplying of web pages.

The web pages themselves are typically defined using a hypertext mark-up language (HTML). HTML simply provides a standard set of tags that define how a web page is to be displayed. When a user indicates to the browser to display a web page, the browser sends a request to the server computer to transfer to the client computer system an HTML document that defines the web page. When the requested HTML document is received by the client computer system, the browser displays the web page as defined by the HTML document. The HTML document contains various tags that control the displaying of text graphics, controls, and other features. The HTML document may further contain URLs of other web pages or of other documents or other types of content, such as, but not limited to, audio and video content, available on that server computer system or other server computer systems. These URLs are often referred to as links. Each of these links may be selected by the HTML document user and an HTTP request is sent to the associated web server.

Although the origins of the worldwide web arose from the need for an exchange of scientific and engineering information between scientists and engineers, the worldwide web has become especially conducive to conducting electronic commerce (e-commerce), searching for information by individuals for both personal and professional use, and for managing and facilitating day-to-day activities by individuals in a personal and professional context, among others.

It has become increasingly desired that individuals be able to gain access to the resources and content available through the World Wide Web while using any of a variety of mobile devices, including, but not limited to mobile computers, cellular telephones, personal digital assistants and handheld computers. With increased demands being put on these devices, users increasingly demand access to content available over the World Wide Web that would conventionally be available to a personal computer user as well, for example. Portable devices, such as handheld computers typically do not have the communication bandwidth typically associated with a personal computer. The wireless link over which the handheld computer communicates with the wireless server typically has a relatively low bandwidth.

Accordingly, there is a need for software for both handheld computers (as well as mobile computers and cellular telephones) and server computers which enable content delivery and exchange over a wireless communication link. There is also a need for a "plug-in" software mechanism for computer servers and handheld computers which facilitates content delivery to and from a handheld computer by particular formatting and/or compression. Further still, there is a need for methods for delivering content provided over a communications network, to a handheld computer.

The techniques herein below extend to those embodiments which fall within the scope of the appended claims, regardless of whether they accomplish one or more of the above mentioned needs.

SUMMARY OF THE INVENTION

An exemplary embodiment relates to a method of obtaining content to be accessed on a handheld computer. The method includes sending a request for content by a server on a communications network. The method also includes retrieving the content by the server. Further, the method includes converting the content by the server, to a format useable by a handheld computer. Further still, the method includes sending the content to the handheld computer.

Another exemplary embodiment relates to a system configured for a handheld computer to access content. The system includes a handheld computer. The system also includes a server in communication with the handheld computer. Further, the system includes a content server in communication with the server. Further still, the system includes a server program running on one of the server and the content server and configured to format the content into a form for delivery to a handheld computer. Yet further still, the system includes a handheld program running on the handheld computer and configured to receive the formatted content and provide access to the content by a user using the handheld computer.

Further, another exemplary embodiment relates to a method of accessing content on a handheld computer. The method includes establishing a communications link with a server coupled to a communications network. The method also includes running a browser program on the handheld computer. Further, the method includes receiving data configured to be viewed using the browser. Further still, the method includes requesting content from a location described by the data. Yet further still, the method includes receiving the content in a format designed for the handheld computer. Yet further still, the method includes converting the content to a format useable by an application on the handheld computer.

Further still, another exemplary embodiment relates to a method of accessing content on a handheld computer. The method includes receiving a request for content, in a third party format, by a server coupled to a communications network. The method also includes sending the request for content to a server having the capability to convert third party format content to a handheld format. Further, the method includes requesting the content, by the server having the capability to convert third party format content to a handheld format, from a content source. Further still, the method includes receiving the content by the server having the capability to convert third party format content to a handheld format and converting the content to the handheld format.

Yet further still, another exemplary embodiment relates to a method of accessing information over a communications network by a handheld computer. The method includes operating a browser on a handheld computer. The method also includes requesting from a first server a browser document over a wireless link. Further, the method includes requesting from a second server by the first server a browser document in a customized format. Further still, the method includes retrieving by the first server from the second server a browser document in the customized format. Yet further still, the method includes retrieving over a wireless link the browser document in the customized format from the first server.

Yet still another exemplary embodiment relates to a system configured for a handheld computer to access content. The system includes a handheld computer, a first server in communication with the handheld computer, a second server in communication with the first server, and a third server in communication with the first server and with the second server and the third server being a source for content requested by the handheld computer. The system also includes a server program running on the second server and the server program configured to format the content into a form for delivery to a handheld computer. Further, the system includes a handheld program running on the handheld computer and configured to receive the formatted content from the first server and provide access to the content by a user using the handheld computer.

Yet still a further exemplary embodiment relates to a system configured for a handheld computer to access content. The system includes a handheld computer and a wireless gateway. The system also includes a first server in communication with the wireless gateway and a second server in communication with the first server. The system also includes a third server in communication with the first server and the second server and the third server being a source for content requested by the handheld computer. Further, the system includes a server program running on the second server and the server program configured to format the content into a form for delivery to a handheld computer through the wireless gateway. Further still, the system includes a handheld program running on the handheld computer and configured to receive the formatted content from the wireless gateway and provide access to the content by a user using the handheld computer.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF EXEMPLARY EMBODIMENTS

Figure 1:
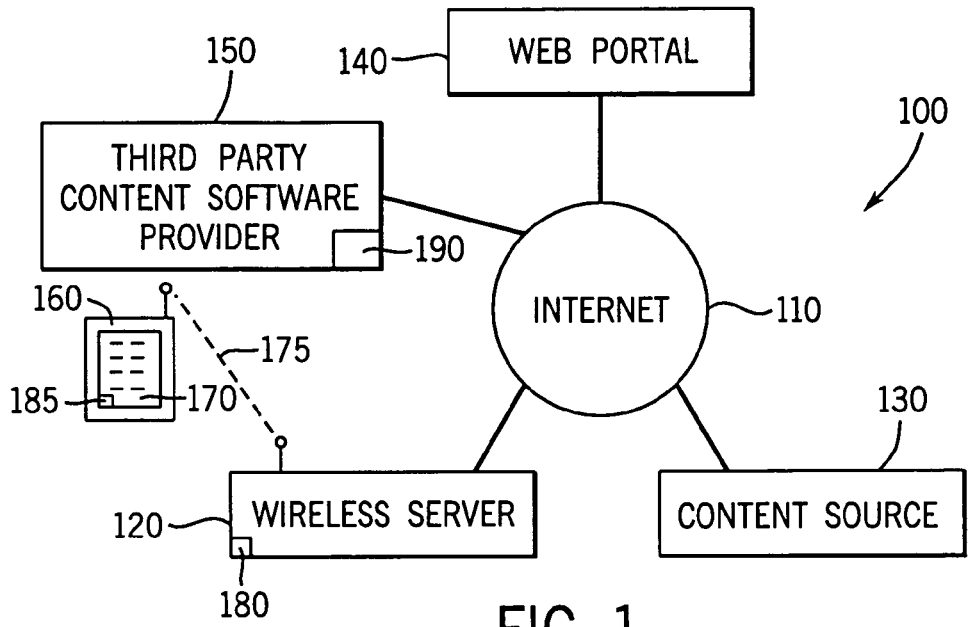
FIG. 1 is a block diagram of a communication network and a handheld computer connected wirelessly thereto.

Referring to FIG. 1, a communications system 100 is depicted. Communications system 100 includes the internet 110 or any other type of communications system. In the exemplary embodiment depicted, internet 110 is a widely distributed communications system in which a plurality of server and client computers are coupled in communication with a plurality of other server and client computers distributed worldwide. For example, server computers may include such servers as a wireless server 120, a content source 130, a web portal 140, a third party content software provider server 150 and many other types of server computers having a variety of functions and resources. In the exemplary embodiment depicted in FIG. 1, wireless server 120 services a plurality of handheld computers, such as handheld computer 160. Handheld computer 160 may be any of a variety of handheld computers, such as, but not limited to personal digital assistants, palmhelds, palmtop computers, cellular telephones, wireless pagers, and the like. Handheld computer 160 is configured to communicate wirelessly with wireless server 120 and therefore gain access to resources over internet 110. For example, web browser 170 may be configured to access HTML web pages via wireless server 120 which communicates over internet 110.

During an exemplary usage of web browser 170, a user utilizing handheld computer 160 often wishes to download and view certain documents available over internet 110 from such sources as content source 130. Accordingly, a user utilizing web browser 170 would "click on", select, or request, access to the content by communicating a URL associated with the content, to wireless server 120 which communicates over internet 110. The URL directs the request to content source 130.

In an exemplary embodiment, the content source may be any of a variety of document or content types, such as, but not limited to, Microsoft Word (.doc) documents, Adobe Acrobat (.pdf) files, sound files such as .wav files, picture files such as .gif, or .jpg files, video files such as .mpg files, or many other types of files and/or content. Conventionally, handheld computers 160 are not necessarily set up to view the plurality of content types which may be available over internet 110, from sources such as content source 130 because of display limitations, bandwidth limitations, memory limitations, and other limitations associated with a handheld or portable device. Because wireless link 175 may be a relatively low bandwidth data link, it may be advantageous to communicate such content from wireless server 120 to handheld computer 160 in a compressed format. Therefore, as wireless server 120 accesses content from content source 130 and receives the content therefrom, wireless server 120 is configured with a software program or software plug-in mechanism 180 which is configured to convert the content received from content source 130 into a compressed format and further into a format usable by handheld computer 160. Likewise, handheld computer 160 runs a software program or software plug-in mechanism which is also configured to either decompress the compressed content received from wireless server 180 or to directly read and utilize the content received from wireless server 180 in a format which is viewable and usable on handheld computer 160. Plug-in mechanism 180 along with plug-in mechanism 185 enables communication of content from sources such as content source 130 over wireless interconnection 175 such that the content is accessible and viewable by handheld computer 160.

In another exemplary embodiment, handheld computer 160, using browser 170, communicates a request for content over wireless link 175 to wireless server 120. Wireless server 120 communicates the request to a third party content software provider 150. Third party content software provider 150 is associated with the type of content requested by wireless server 120. Wireless server 120 communicates the URL for the content to third party content software provider 150. Third content software provider 150 uses the URL received from wireless server 120 to retrieve content from a content source such as content source 130. Third party content software provider 150 includes formatting software 190 which is used to format the content for communication to devices such as handheld computer 160 over wireless links. Accordingly, third party content software provider 150 uses formatting software 190 to format the content retrieved from content source 130 and then communicates the formatted content to wireless server 120 over internet 110. Wireless server 120 then sends the formatted content over wireless links 175 to handheld computer 160. Handheld computer 160 uses plug-in mechanism 185 to read the formatted information from wireless server 120 and view such information on the display. In an exemplary embodiment, third party content software provider 150 is the third party which writes software for creating content, for example, third party content software provider may be a provider of software for creating .doc files, .jpg files, or .pdf files, for example. Accordingly, the third party content software provider may be the best source for providing a plug-in mechanism 190 for formatting such content for access by a handheld computer 160 over a wireless link 175.

In another exemplary embodiment, the user of handheld computer 160 using browser 170 via wireless link 175 may request web page information from a variety of sources on the internet such as web portal 140 or any of a variety of other websites. Conventionally, if web portal 140 receives a request from handheld computer 160 the web page is delivered to wireless server 120 which communicates the HTML document over wireless link 175 to handheld computer 160. Handheld computer 160 then views the HTML document using browser 170. However, browser 170, having a limited display area, may have limited capabilities to easily read and access the web page. Accordingly, it is often desirable to have a web page which is formatted in accordance with the display constraints of handheld computer 160 using browser 170. Therefore, when the user of handheld computer 160 requests a web page from web portal 140, the web page identifies that the requesting computer is a handheld computer running a browser 170 and accordingly formats the HTML document for the display constraints of handheld computer 160 before communicating such HTML document to wireless server 120. Wireless server 120 receives the formatted HTML document and communicates the HTML document with or without compression over wireless link 175. If the HTML document received by handheld computer 160 is in a compressed format, handheld computer 160 utilizes mechanism 185 for uncompressing the HTML document and the document is viewable using browser 170. However, if the document is not compressed, the user of handheld computer 160 simply views the document on handheld computer 160 using browser 170.

Figure 2:
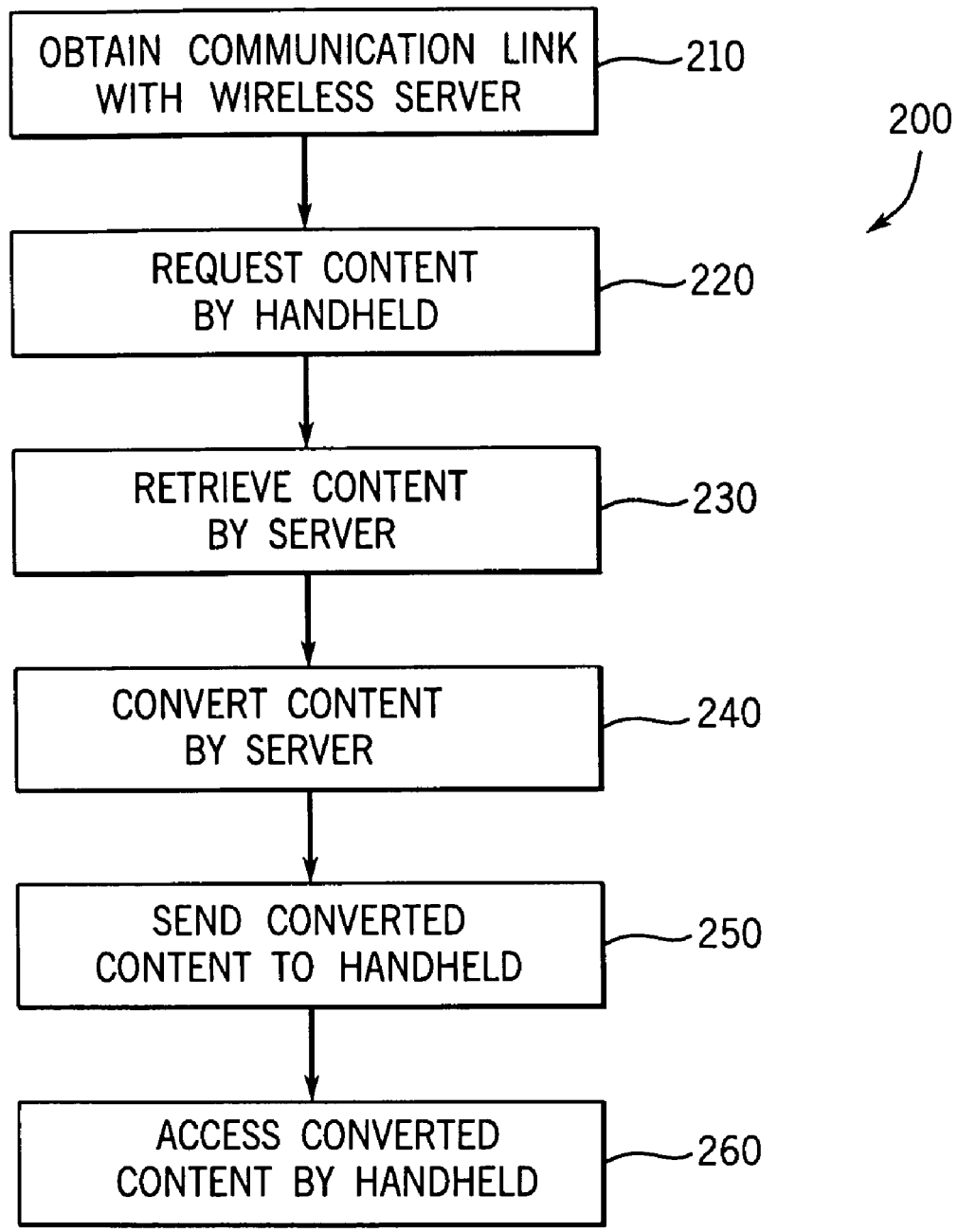
FIG. 2 is a flow diagram depicting steps of obtaining content by a handheld computer.

Referring now to FIG. 2, a flow diagram 200 depicting steps of obtaining content by a handheld computer, is depicted. In an exemplary embodiment, a handheld computer, such as handheld computer 160 obtains a communications link, such as link 175, with a wireless server, such as wireless server 120 (step 210). Once the communications link with wireless server 120 is obtained, a request is made by a user of handheld computer 160 over wireless link 175 to wireless server 120 (step 220). Wireless server 120 retrieves content over internet 110 in accordance with the request for content (step 230). The content is then received and converted by server 120 using a plug-in mechanism, such as mechanism 180, into a format which is configured to be sent over wireless link 175 (step 240). The converted content is then sent over wireless link 175 to handheld computer 160 (step 250). The converted content is then accessed by handheld computer 160 using the plug-in mechanism 185 to convert the formatted content to a form displayable or usable by handheld computer 160 (step 260).

Figure 3:
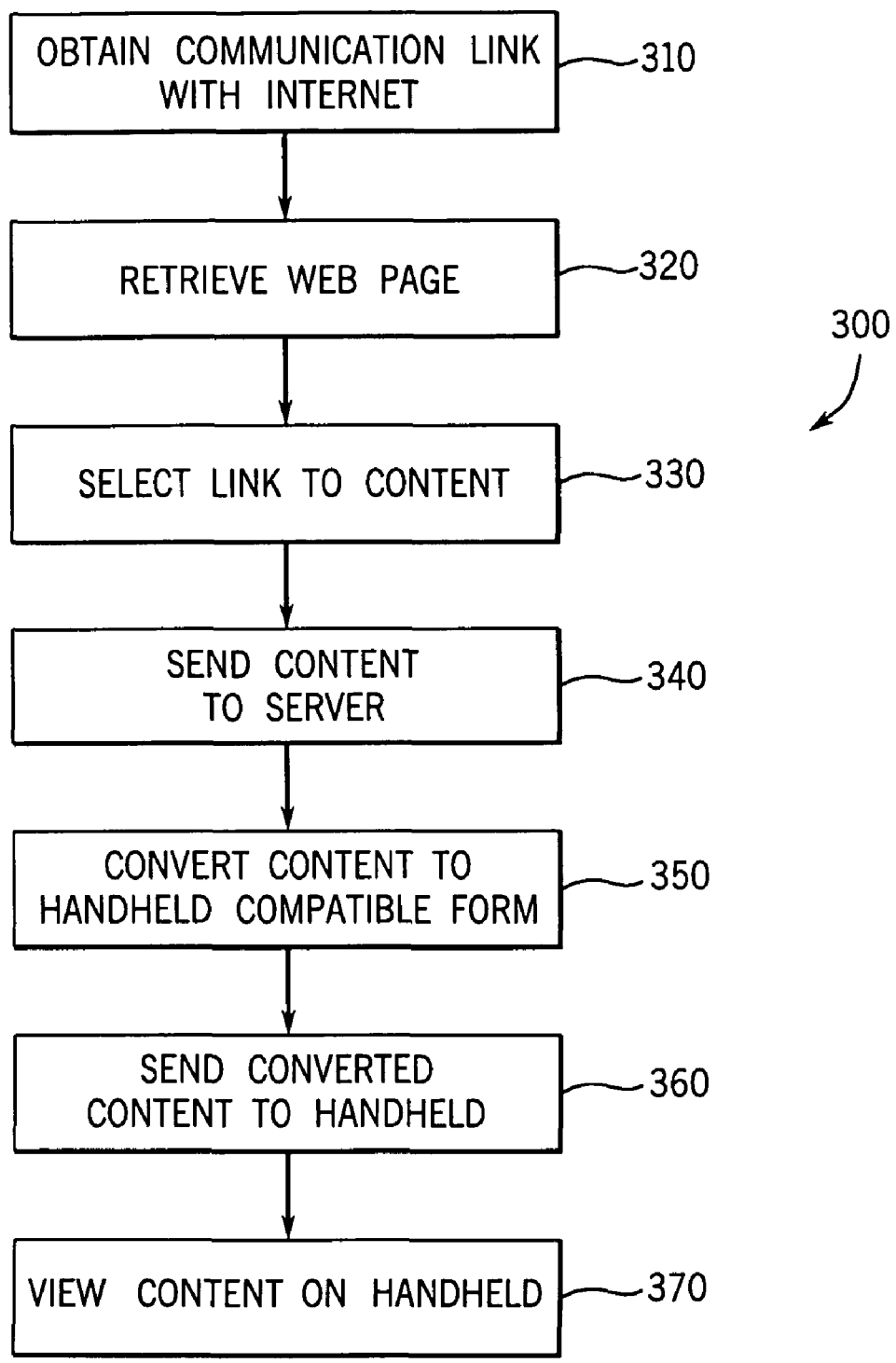
FIG. 3 is a flow diagram depicting alternative steps of obtaining content by a handheld computer.

Referring now to FIG. 3, a flow diagram 300 including alternative steps of obtaining content by handheld computer 160 is depicted. In flow diagram 300, a handheld computer 160 obtains a communication link with internet 110 (step 310). Handheld computer 160 then retrieves a web page from a web server over the internet (step 320). A user selects a link to content using a browser 170 running on handheld computer 160 (step 330). Content is sent to a server, such as wireless server 120 (step 340). The content is converted to a handheld compatible form using a software application such as plug-in mechanism 180 (step 350). The converted content is then sent to the handheld computer 160 (step 360). Finally, the content is viewed or used by a user utilizing handheld computer 160 by converting or using the converted content with or without a specialized plug-in mechanism 185 on handheld computer 160 (step 370).

Figure 4:
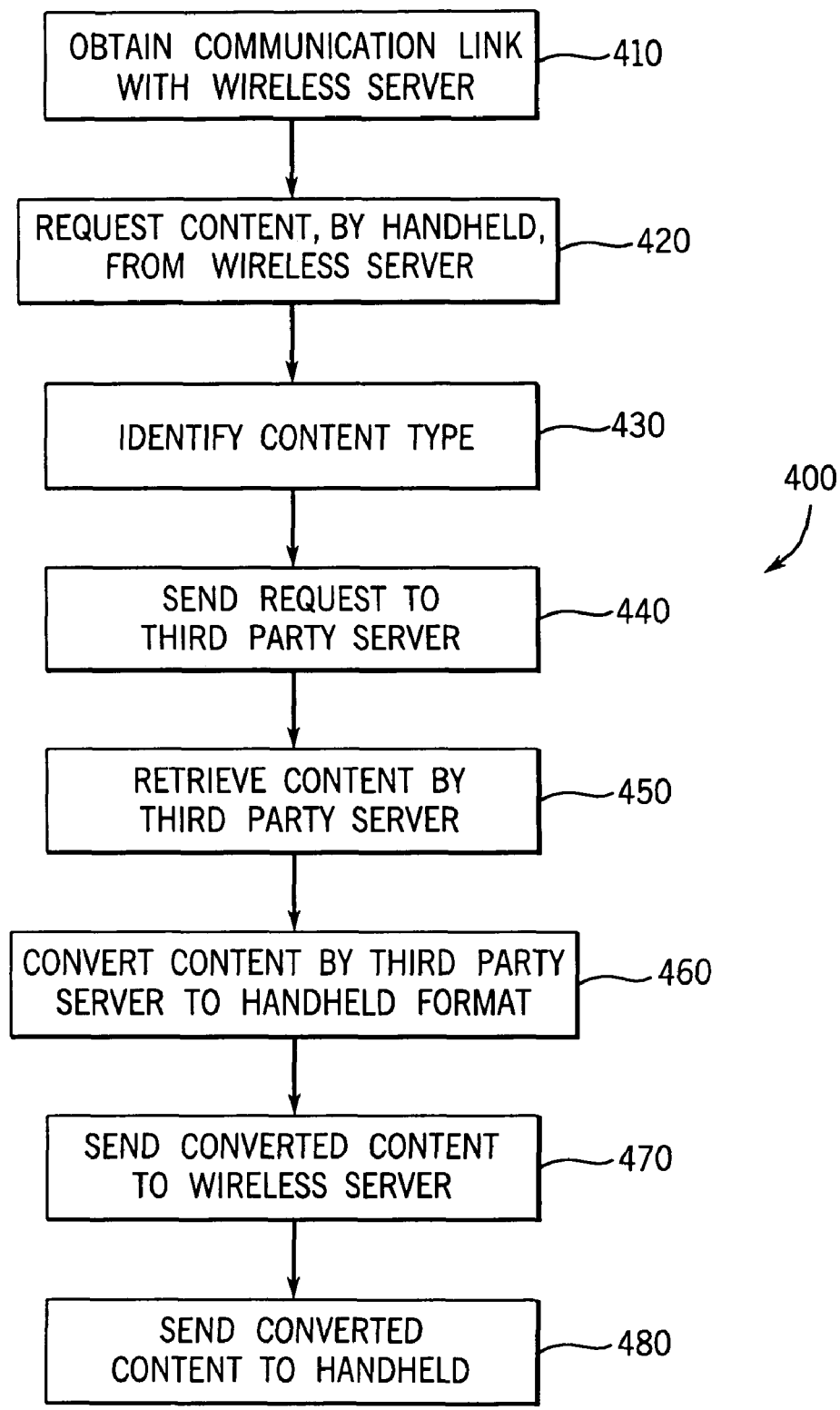
FIG. 4 is a flow diagram depicting another set of alternative steps of obtaining content by a handheld computer.

In another exemplary embodiment, a flow diagram 400 is shown in FIG. 4 depicting alternative steps of obtaining content by a handheld computer. Process 400 includes obtaining a communications link 175 with a wireless server 120 (step 410). A handheld computer 160 requests content from the wireless server 120 via communications link 175 (step 420). Wireless server 120 identifies the type of content requested (step 430). The request is sent to third party server 150 associated with the type of content that has been requested (step 440). The third party server 150 retrieves the content from a content source 130 (step 440). The retrieved content is converted by third party server 150 to a handheld compatible format (step 460). The handheld compatible format of the content is sent to wireless server 120 (step 470). Wireless server 170 then sends the converted content to handheld computer 160 over communications link 175 (step 480). Handheld computer 480 then is able to utilize the converted format either by directly using such format or by converting the format to a usable format through a plug-in mechanism such as plug-in mechanism 185. In a particular embodiment, converted content is a compressed form such that it is easily transmitted over a bandwidth limited communications link such as link 175.

Figure 5:
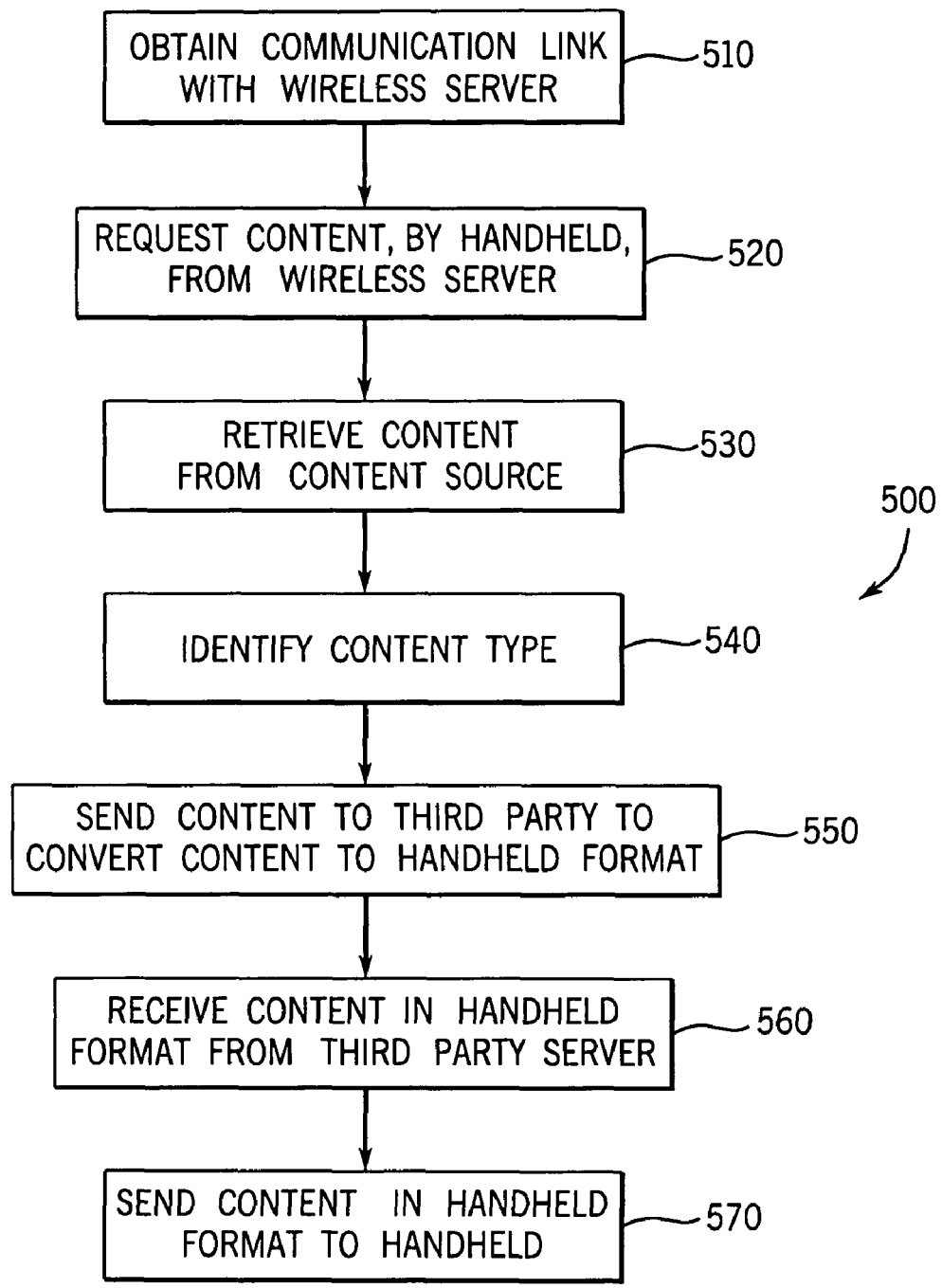
FIG. 5 is a flow diagram depicting yet another set of alternative steps for obtaining content by a handheld computer.

In yet another exemplary embodiment, a process 500 is depicted in FIG. 5 showing alternative steps of obtaining content by handheld computer 160. Handheld computer 160 contains a wireless communications link 175 with a wireless server 120 (step 510). A user of handheld computer 160 requests content through handheld computer 160 from wireless server 120 (step 520). Wireless server 120 retrieves content from a content source 130 (step 530). The type of content is identified by wireless server 120 (step 540)and sends the content to a third party server 150 to convert the content to a handheld format (step 550). Wireless server 120 receives the content in the handheld format from the third party server 150 (step 560). The wireless server sends the content in the handheld format over wireless link 175 to handheld computer 160 (step 570).

Figure 6:
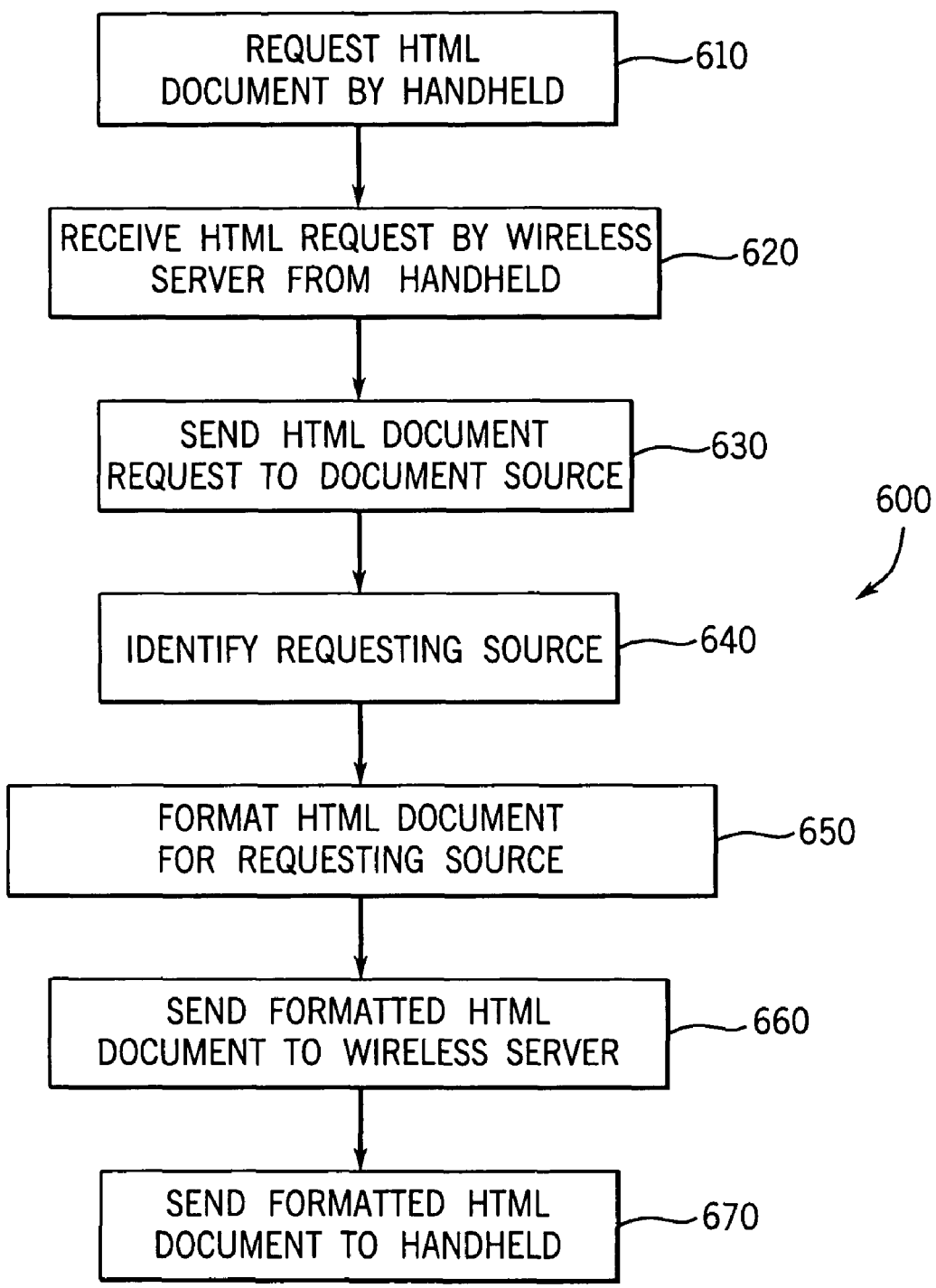
FIG. 6 is a flow diagram depicting yet another set of alternative steps of obtaining content by a handheld computer.

Referring now to FIG. 6, yet another process 600 is depicted in which a request for an HTML document is made by handheld computer 160 (step 610). Wireless server 120 receives the HTML request from handheld 160 (step 620). The HTML is sent to the document source, such as web portal 140 (step 630). Web portal 140 identifies the type of requesting source (step 640). Web portal 140 then formats the HTML document in a format appropriate for the type of requesting source, such as handheld computer 160 (step 650). The formatted HTML document is then sent to wireless server 120 (step 660). The formatted HTML document is then sent over wireless link 175 to handheld computer 160 for viewing on browser 170 (step 670).

Figure 7:
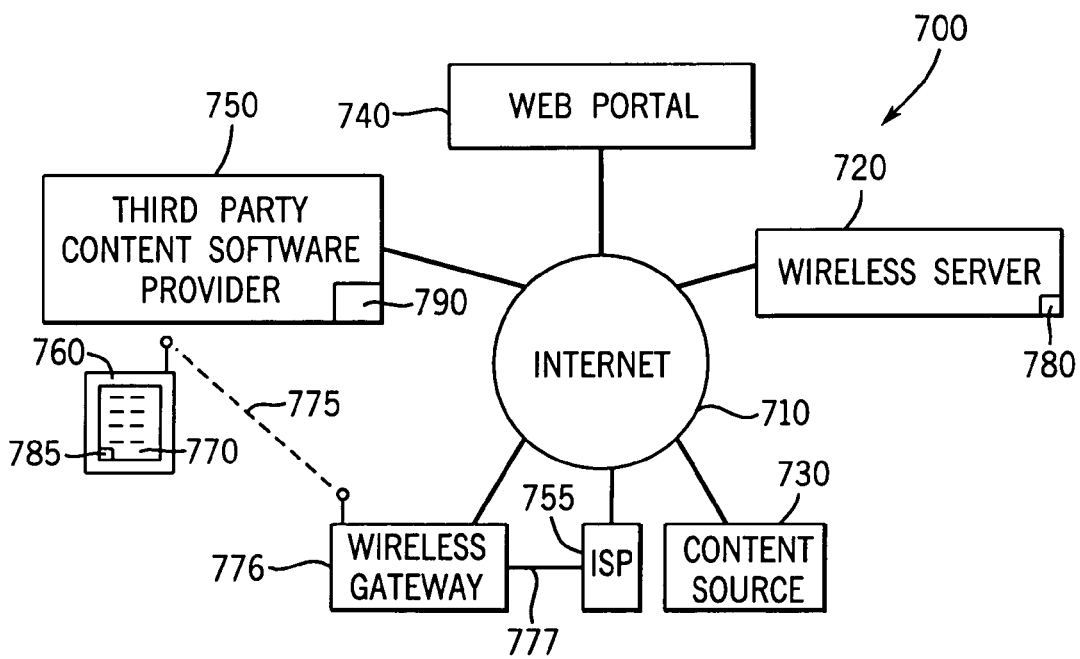
FIG. 7 is a block diagram of an alternative communication network and a handheld computer connected wirelessly thereto.

Referring now to FIG. 7, another exemplary embodiment of a communication system 700 is depicted. Communication system 700 includes the internet 710 or any other type of communication system. In the exemplary embodiment depicted, internet 710 is a widely distributed communication system in which the plurality of server and client computers are coupled in communication with a plurality of other server and client computers geographically distributed. For example, server computers may include such servers as wireless server 720, a content source 730, a web portal 740, a third party content software provider 750, an internet service provider 755, and many other types of server computers having a variety of functions and resources. In the exemplary embodiment depicted in FIG. 7, wireless server 720 is configured to service a plurality of handheld computers, such as handheld computer 760 that is in communication, over a wireless link 775, with a wireless gateway 776. Wireless gateway 776 is configured with a communication connection 777 coupled to ISP 755 which communicates with wireless server 720 over internet 710. Wireless server 720 provides reformatted content to wireless gateway 776 over internet 710. For example, web browser 770 may be configured to access HTML web pages via wireless server 720 which communicates with ISP 755 over internet 710.

During an exemplary usage of web browser 770, a user utilizing handheld computer 760 may wish to download and view documents available over internet 710 from such sources as content source 730. Accordingly, a user utilizing web browser 770 would select or request access to the content by communicating a URL associated with the content, to wireless server 720 by providing the URL over wireless link 775 to wireless gateway 776 over link 777 to ISP 755 and over internet 710 to wireless server 720. Wireless server 720 directs the request to content source 730.

Further, in an exemplary embodiment, wireless server 720 would receive the document and may be configured with software or a software plug-in mechanism 780 which is configured to convert the content received from the content source 730 into a compressed format and further into a format usable by handheld computer 760. The compressed and/or formatted content is communicated over internet 710 to ISP 755 which communicates the compressed document over link 777 to wireless gateway 776. The compressed document is then communicated over wireless link 775 to handheld computer 760. Handheld computer 760 utilizes a software program 785 to uncompress or to facilitate viewing of the document on browser 770.

In another exemplary embodiment, a document request made by handheld computer 770 is communicated through wireless gateway 776 and ISP 755 to wireless server 720. Wireless server 720 may determine the type of document requested and send such request to a third party content software provider 750. Third party content software provider 750 then retrieves the content requested from content source 730. Third party content software provider 750 utilizes a software mechanism 790 to format the software into a handheld format or compress the document into a format suitable for wireless transfer and then send the formatted and/or compressed document back to either wireless server 720 or directly to ISP 755. In the case that the compressed and/or formatted document is sent to wireless server 720, the document is relayed to ISP 755. In either case, once ISP 755 receives the compressed and/or formatted document, the document is transmitted over link 777 to wireless gateway 776 which transmits the document over wireless link 775 to handheld 760.

In yet another exemplary embodiment, a user of handheld computer 760 requests an HTML document over wireless link 775 through wireless gateway 776 and ISP 755. The request may go directly to web portal 740. Web portal 740 is able to identify that the request is coming from a handheld computer and therefore formats or provides a formatted HTML or HTML type document directly to ISP 755. ISP 755 then communicates the formatted HTML or HTML type document over wireless link 777 to wireless gateway 776 and over wireless link 775 to handheld computer 760.

While the detailed drawings, specific examples and particular formulations given describe exemplary embodiments, they serve the purpose of illustration only. The hardware and software configurations shown and described may differ depending on the chosen performance characteristics and physical characteristics of the computing devices. For example, the type of computing device, communications networks, or devices used may differ. The methods and systems shown and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A handheld computer system to access content for a user, comprising:
   a handheld computer capable of transmitting a request for content and lacking the capability to access the content in an unformatted form;
   a first server in communication with the handheld computer;
   a second server with formatting capability to format the content of the request, and in communication with the first server, to receive the request for content, the second server being configured to send the formatted request to a source of the content;
   a third server in wireless communication with both the first server and with the second server over a wireless communication link, the third server being a source for the content requested by the handheld computer, the third server receiving the formatted request from the second server and delivering the content requested to the second server;
   the second server further having formatting capability and configured to format the content requested into a form for delivery to the handheld computer; and wherein the first server is configured to retrieve formatted content from the second server and send the formatted content to the handheld computer;

the handheld computer configured to receive the requested formatted content, from the first server and to provide access to the content by the user of the handheld computer.

2. The system of claim 1, wherein the first server is configured to receive the request for content from the handheld computer.

3. The system of claim 2, wherein the first server is configured to retrieve the content from the third server.

4. The system of claim 3, wherein the first server is configured to provide the content to the second server.

5. The system of claim 4, wherein the second server is configured to convert the content to a convened format suitable for communication to the handheld computer.

6. The system of claim 2, wherein the first server is configured to communicate a link to the content, on the third server, to the second server.

7. The system of claim 6, wherein the second server is configured to retrieve the content from the third server.

8. The system of claim 7, wherein the second server is configured to convert the content to a converted format suitable for communication to the handheld computer.

9. The system of claim 1, wherein the handheld computer is in wireless communication with the first server.

10. A handheld computer system to access content for a user, comprising:

a handheld computer capable of transmitting a request for content and lacking the capability to access the content in an unformatted form;

a wireless gateway;

a first server in communication with the wireless gateway;

a second server with formatting capability to format the content of the request, and in communication with the first server, to receive the request for content, the second server being configured to send the formatted request for content to a source of the content provided the second server is configured with formatting software for the request type of content;

a third server in wireless communication with both the first server and with second server being a source for content as requested by the handheld computer, the third server receiving the formatted request from the second server and delivering the content requested to the second server; and the second server further having formatting capability and configured to format the content requested into a form for delivery to a handheld computer through the wireless gateway.

11. The system of claim 10, wherein the second server is configured to receive the request for content from the handheld computer.

12. The system of claim 11, wherein the second server is configured to retrieve the content from the third server.

13. The system of claim 12, wherein the third server is configured to provide the content to the second server.

14. The system of claim 13, wherein the second server is configured to convert the content to a convened format suitable for communication to the handheld computer.

15. The system of claim 11, wherein the first server is configured to communicate a link to the content, on the third server, to the second server.

16. The system of claim 15, wherein the second server is configured to retrieve the content from the third server.

17. The system of claim 16, wherein the second server is configured to convert the content to a converted format suitable for communication to the handheld computer.

18. The system of claim 10, wherein the handheld computer is in wireless communication with the first server through the wireless gateway.

* * * * *